United States Patent [19]

Irizarry

[11] Patent Number: 5,651,468

[45] Date of Patent: Jul. 29, 1997

[54] HOLDER FOR THIN PLANAR OBJECTS

[76] Inventor: Joseph Irizarry, HC 89 Box 51, Firehouse Rd., Pocono Pines, Pa. 18350

[21] Appl. No.: 645,129

[22] Filed: May 13, 1996

Related U.S. Application Data

[63] Continuation-in-part of Ser. No. 556,575, Nov. 13, 1995.

[51] Int. Cl.[6] ........................................... A47F 7/00
[52] U.S. Cl. ..................... 211/120; 248/230.7; 84/329
[58] Field of Search ................................ 211/120, 69.8, 211/13, 45; 248/443, 302, 363, 450, 451, 229.16, 230.7, 175; 84/DIG. 3, 453, 329

[56] References Cited

U.S. PATENT DOCUMENTS

| | | |
|---|---|---|
| D. 355,667 | 2/1995 | Burger ................... 84/329 X |
| 356,315 | 1/1887 | Hunt . |
| 439,210 | 10/1890 | Thome . |
| 548,646 | 10/1895 | Lowry . |
| 635,121 | 10/1899 | Bostrom . |
| 780,443 | 1/1905 | Phillips et al. . |
| 1,064,788 | 6/1913 | Terry . |
| 1,134,988 | 4/1915 | Bellinger . |
| 1,325,807 | 12/1919 | Siemann . |
| 1,390,389 | 9/1921 | Rosenfeld . |
| 1,408,970 | 3/1922 | Ayer . |
| 1,496,072 | 3/1924 | Gillespie ................ 248/230.7 X |
| 1,523,555 | 1/1925 | Murphy . |
| 1,523,744 | 1/1925 | Ayer . |
| 1,527,846 | 2/1925 | De Clark . |
| 1,705,339 | 3/1929 | Plottle . |
| 1,747,157 | 2/1930 | Brown . |
| 1,822,734 | 9/1931 | Harrington . |
| 2,298,758 | 10/1942 | Fischer ................... 240/52.1 |
| 2,366,483 | 1/1945 | Bona ..................... 120/108 |
| 2,444,350 | 6/1948 | Harpster ................. 248/51 |
| 2,456,302 | 12/1948 | Mocnik .................. 248/302 X |
| 2,605,907 | 8/1952 | Hirst ..................... 211/120 |
| 2,930,156 | 3/1960 | Jones .................... 40/11 |
| 3,135,393 | 6/1964 | Avsharian et al. ........ 211/120 |
| 3,544,056 | 12/1970 | Berquist ................. 248/443 |
| 4,890,531 | 1/1990 | Tischer .................. 84/329 |

*Primary Examiner*—Robert W. Gibson, Jr.
*Attorney, Agent, or Firm*—Ohlandt, Greeley, Ruggiero & Perle

[57] ABSTRACT

There is provided a holder for guitar picks that is adapted to be mounted to a guitar, a microphone stand or other structure. The holder provides quick and easy access to the guitar picks and comprises an arcuate coil of resilient wire secured to a retainer. The retainer has a base portion and a pair of arms extending from the base portion for clamping about the guitar or microphone stand. The arcuate coil of resilient wire is secured to the base portion of the retainer and has a plurality of individual turns that form a plurality of slots for receiving the guitar picks. Each individual turn of the arcuate coil has a substantially circular cross-section. In addition, the arms of the retainer clamp against the outer surface of the structure, such as the guitar or microphone stand, to support the retainer thereon.

20 Claims, 2 Drawing Sheets

5,651,468

HOLDER FOR THIN PLANAR OBJECTS

RELATED APPLICATION

This application is a continuation-in-part of U.S. patent application Ser. No. 08/556,575, which was filed on Nov. 13, 1995.

BACKGROUND OF THE INVENTION

I. Field of the Invention

The present invention relates generally to a holder for thin planar objects, such as a guitar pick, that provides convenient access to the object. More particularly, the present invention relates to a guitar pick holder adapted to be mounted to a guitar or microphone stand that provides quick and easy access to the guitar pick by a musician.

Musicians prefer to have their equipment readily available to them when they are practicing or performing so that they may concentrate on their music. Guitar players, in particular, prefer to have an ample supply of guitar picks within arms reach in order to minimize interruptions. Also, guitar players would like to set aside and retrieve these guitar picks without having to spend significant time, attention or dexterity in doing so. Thus, it is convenient for a guitar player to have a guitar pick holder that may be positioned on the guitar or a nearby microphone stand and provides quick and easy access to the guitar picks.

II. Description of the Prior Art

Guitars, particularly acoustic guitars, are delicate instruments that are handled with care by their owners. Generally, the neck and body of a guitar are made of a soft wood that is suitable for resounding harmonious tones. Thus, special care must be taken to avoid damaging or marring the surface of the guitar when a foreign object, such as a guitar pick holder, is attached to the guitar. Also, the body of the guitar acts as an echo chamber that resonates tones generated by strings of the guitar. Placement of a foreign object on the guitar body may dampen the guitar's ability to resonate and, thus, hurt its tone quality. Accordingly, most guitar players are adverse to the placement of foreign objects on the surfaces of their guitars.

It is known that a sheet music holder may be placed at the neck of a guitar to provide convenient viewing of sheet music for a guitar player. Since the neck of a guitar is relatively slender, a dual-lever clamp of a holder may be used to grip the upper and lower surfaces of the neck. To avoid damaging or marring the surface of the guitar neck, the clamp may include rubber sleeves to protect the guitar neck. For example, U.S. Pat. No. 3,544,056 to J. E. Berquist, which issued on Dec. 1, 1970, provides a sheet music stand having a back panel and a dual-lever clamp that attaches to the neck of a guitar. The clamp includes a pair of lever arms with a rubber sleeve covering each arm to reduce damage or marring to guitar neck.

In order to support the back panel, the sheet music holder described above must have a substantial grip of the guitar neck. Thus, the lever arms of the holder's clamp have large, flat contact surfaces that grip on the guitar neck from above and below. Accordingly, damage or marring to the surface of the guitar neck may still occur do to the large contact surfaces of the clamp and the substantial weight of the back panel.

In addition, the above sheet music holder lacks the ability to support a plurality of guitar picks and provide quick and easy access to them. In particular, a spring clip attached to the back panel of the sheet music holder provide only one slot to hold sheet music. A musician must take care to skillfully slide the sheet music into the slot. Accordingly, the above described sheet music holder is not suitable for holding a plurality of guitar picks.

As an alternative to the above described dual-lever clamp, a one-piece clip is a simpler and lighter means for attachment to a guitar neck. The grip of a one-piece clip is not as strong as that of the dual-lever clamp. Accordingly, the one-piece clip is suitable for supporting items that are much lighter than a back panel, such as pencils or guitar clips.

For example, U.S. Pat. No. 1,705,339 to E. I. Plottle, which issued on Mar. 12, 1929 and U.S. Pat. No. 3,135,393 to M. Avsharian, et al., which issued on Jun. 2, 1964, each provide a pencil holder having a one-piece clip for attachment to a telephone and a linearly arranged spring for holding a plurality of pencils. In particular, U.S. Pat. No. 1,705,339 describes a cylindrical clip that wraps around the cylindrical base of an old fashion telephone, and U.S. Pat. No. 3,135,393 describes a dual-arm clip that clamps to a flat edge at the base of a more modern telephone. The dual-arm clip includes a flat arm that is placed flush against one side of the flat edge and a curved arm that is angled against the opposite side of the flat edge. The cylindrical and dual-arm clips of the above pencil holders clamp large contact surfaces of their supporting structures.

The cylindrical and dual-arm clips of the above described pencil holders require a large contact surface for gripping a supporting structure. Thus, damage or marring to the surface of the guitar neck may still occur.

In addition, the above pencil holders do not provide quick and easy access to held objects. In particular, the spring of each holder extends linearly and horizontally away from the clip. Thus, to place a pencil in the holder, the pencil must be held above the spring and brought directly down toward the spring. Likewise, for removal, the pencil is lifted directly up from the spring. Accordingly, the above described pencil holders are not suitable for quick and easy access to a plurality of guitar picks.

Further, the above pencil holders are not adapted to the unique curvature of a guitar neck. Specifically, each clip includes either a linear arm that sets flush against one side of a flat structure or a rounded body that conforms to a rod-like structure. However, the neck of a guitar has a wide variety of angles and curves, particularly the headstock of the neck. Thus, the clips of the above holders are limited to certain types of surfaces and are not suited for the unique and varying shapes of a guitar neck.

A clip-based holder may also include a spring coil to hold an object. Instead of holding an object between adjacent turns of a spring, the object may be held within the spring coil. For example, U.S. Pat. No. 1,064,788 to A. E. Terry, which issued on Jun. 17, 1913 provides a clip-based holder that is used to hold a fountain pen in a vest pocket or against a shelf. The ends of the spring are joined to form a round coil, and a clip is secured to one side of the coil. Each individual turn of the coil has an elongated shape so that the coil, as a whole, has a substantially cylindrical form. Thus, by sliding the fountain pen through the coil, the inner surface of the coil grips and holds the outer surface of the object. Although the coil may only hold one object, a holder may have multiple coils to hold more than one object.

However, similar to the pencil holder of the above cited U.S. Pat. No. 3,135,393, the above holder with a spring coil has a dual-arm clip. Accordingly, concerns in regard to such a dual-arm clip include damage or marring to the surface of the guitar neck and the inability for quick and easy access to held objects. Also, as described above, dual-arm clips are not adapted to the unique curvature of a guitar neck, including the headstock of the neck.

In addition, the spring coil, as described in the above cited U.S. Pat. No. 1,064,788, is more cumbersome to use than the linearly arranged spring described in the above cited U.S. Pat. Nos. 1,705,339 and 3,135,393. The placement of an object through a spring coil, and withdrawal therefrom would require special attention by the user. Specifically, the user must expand the coiled spring wire and place the object through the coiled spring wire. Accordingly, the holder of the above patent would require substantial time and concentration.

None of the above patents describe or suggest a guitar pick holder that provides quick and easy access of multiple guitar picks and will not damage or mar the outer surface of a guitar. Also, the above patents do not describe or suggest a holder that adapts to the unique curvature of a guitar neck, including the headstock of the neck. Further, the above patents do not describe or suggest a holder that will not affect the guitar's sound or interfere with the guitar player when the holder is mounted on the neck of the guitar.

SUMMARY OF THE INVENTION

Against the foregoing background, it is a primary object of the present invention to provide a guitar pick holder for attachment to a neck portion of a guitar that permits quick and easy insertion and retrieval of one or more guitar picks.

It is another object of the present invention to provide such a guitar pick holder that holds a plurality of guitar picks with quick and easy access to any one of the plurality of guitar picks.

It is yet another object of the present invention to provide such a guitar pick holder in which insertion and retrieval of the guitar picks may be accomplished by a musician who is playing the guitar without necessarily viewing the guitar pick holder.

It is a further object of the present invention to provide such a guitar pick holder that easily mounts to and detaches from the outer surface of the guitar without marring the finish of the outer surface and/or leaving a residue on the outer surface.

It is a still further object of the present invention to provide such a guitar pick holder that easily mounts to the guitar and does not affect the guitar's sound or interfere with the guitar player.

It is a yet further object of the present invention to provide such a guitar pick holder that may be mounted to a guitar neck or a microphone stand.

To accomplish the foregoing objects and advantages, the present invention is a holder for removable attachment to a supporting structure that provides convenient access to an object held by the holder. The holder, in brief summary, comprises a retainer having a base portion and an arcuate coil of resilient wire secured to the base portion of the retainer. The retainer also includes a pair of arms extending from the base portion for clamping about the supporting structure. The arcuate coil has a plurality of individual turns that form a plurality of slots for receiving the object. In addition, a linear ridge is formed across each arm of the retainer so that the ridges of the pair of arms are effective for applying opposing forces against the supporting structure. Further, each individual turn of said arcuate coil having an outer curvature for receiving the object from any angle.

BRIEF DESCRIPTION OF THE DRAWINGS

The foregoing and still further the objects and advantages of the present invention will be more apparent from the following detailed explanation of the preferred embodiments of the invention in connection with the accompanying drawings.

DETAILED DESCRIPTION OF THE PREFERRED EMBODIMENTS

Figure 1:
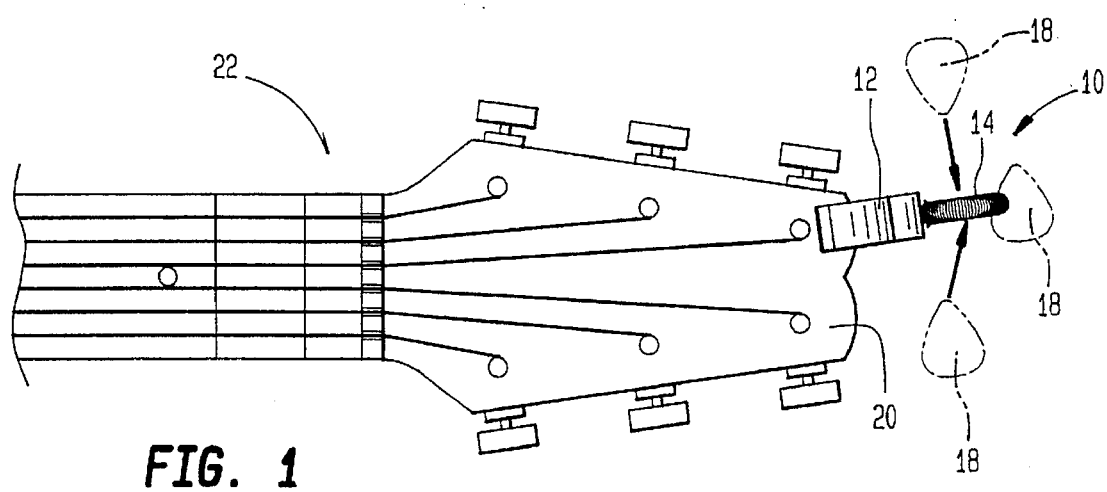
FIG. 1 is a side elevational view of the guitar pick holder of the present invention clamped to the headstock at one end of a guitar neck.
Figure 2:
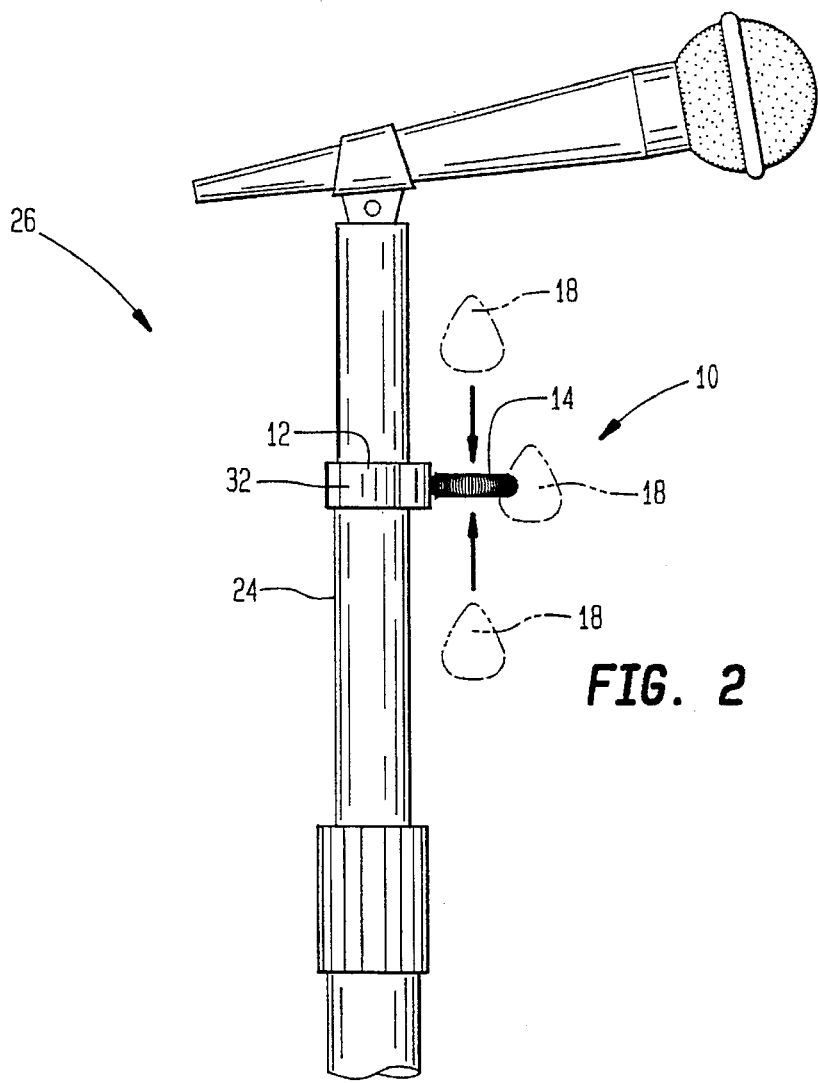
FIG. 2 is a side elevational view of the guitar pick holder of FIG. 1 clamped about a vertical pole of a microphone stand.

Referring to the drawings, there is provided an object holder, specifically a guitar pick holder, of the preferred embodiment which is generally represented by reference numeral 10. As shown in FIGS. 1 and 2, the guitar pick holder 10 comprises a retainer 12 and an elongated coil 14 of resilient wire. In addition, various objects, such as the three guitar picks 18 shown in phantom representation, may be positioned at any portion of the elongated coil 14 that is not already occupied by another object, such as another guitar pick. It is to be understood that the elongated coil 14 of the present invention is designed for holding various types of objects, such as notes, and is not limited to guitar picks.

In addition, the retainer 12 is designed for attachment to any supporting structure that does not have substantial thickness, such as the back of a chair, edge of a desk, cover of a piano or any other structures that may be in the immediate vicinity of a musician. For example, as shown in FIGS. 1 and 2, the holder 10 may be mounted to an end portion 20 of a guitar neck 22, namely the headstock of the neck, or a vertical pole 24 of a microphone stand 26.

Figure 3:
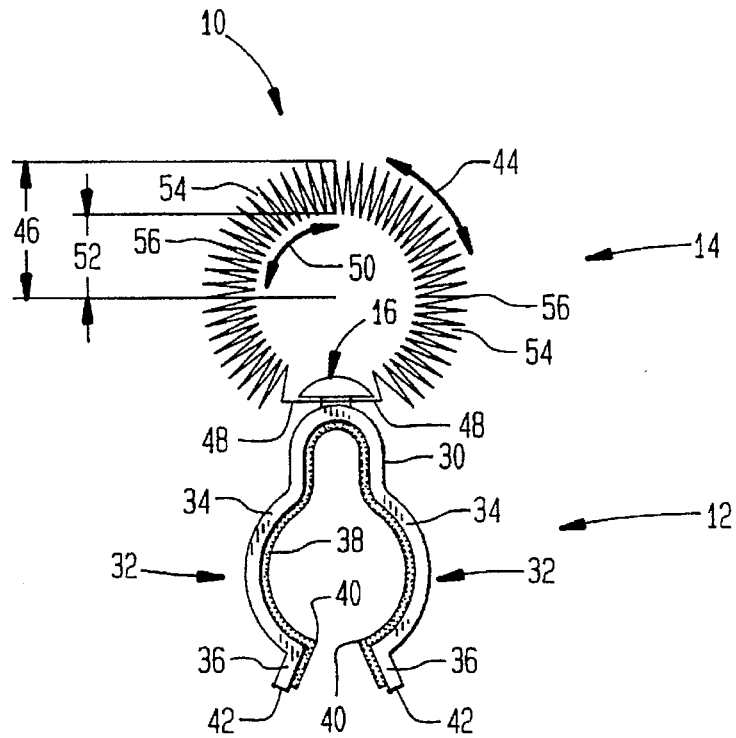
FIG. 3 is a front elevational view of the guitar pick holder of FIG. 1.
Figure 4:
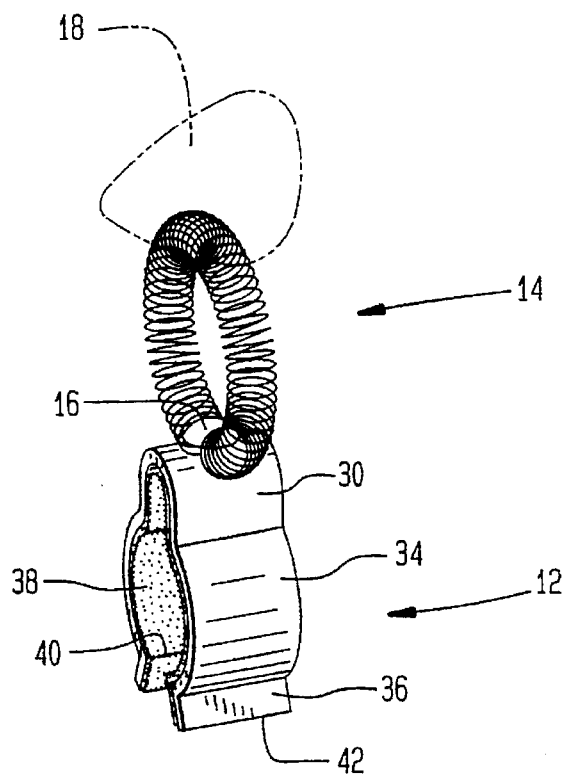
FIG. 4 is a side perspective view of the guitar pick holder of FIG. 1 that includes a guitar pick shown in phantom.

Referring to FIGS. 3 and 4, the retainer 12, preferably, is a pliable plastic element having a base portion 30 and a pair of substantially identical arms 32 extending from the base portion. For removable attachment to the supporting structure, such as the guitar neck 22 or microphone stand 26 shown in FIGS. 1 and 2, the arms 32 of the retainer 12 are clamped about the structure.

Referring specifically to FIG. 3, each arm 32 of the retainer 12 includes a curved body portion 34 extending from the base portion 30 and an angled tab 36 disposed at one end of the arm. Also, a felt-type lining or cushion 38 is provided at an inner surface of the retainer 12 to protect the surface of the supporting structure from possible damage or marring.

An inwardly tapered, linear ridge 40 is formed across each arm 32 of the retainer 12. Specifically, the linear ridge 40 is disposed between the curved body portion 34 and the angled tab 36 of each arm 32. Thus, each linear ridge 40 is offset from the distal end 42 of its respective arm 32. Since the linear ridges 40 are positioned opposite to each other, they effectively apply opposing forces against any supporting structure that is inserted therebetween. Damage or marring to such a supporting structure does not occur since the contact areas between the linear ridge 40 and the structure are very small and, in addition, protection is provided by the felt-type lining or cushion 38. Also, the small contact area between the linear ridge 40 and the supporting structure permits the clip 12 to adapt to various unique curvature of the structure.

As described above in reference to FIGS. 1 and 2, the retainer 12 of the preferred embodiment is capable of attaching to a relatively thin structure, such as the end portion 20 of the guitar neck 22, and a cylindrical structure, such as the vertical pole 24 of the microphone stand 26. Referring to FIGS. 3 and 4, to position the retainer 12 to the end portion 20 of the guitar neck 22, the angled tabs 36 of both arms 32 are pressed or forced apart so that the end portion may be inserted therebetween. The angled tabs 36 provide for easy grasping to secure the retaining clip 12 in place. The arms 32 are then released so that they may apply opposing and substantially equal forces against the sides of the supporting structure. To position the retainer 12 to the vertical pole 24 of the microphone stand 26, the angled tabs 36 of both arms 32 are forced apart so that the vertical pole may be inserted between the curved body portions 34 of the arms. The arms 32 are then released so that the curved body portions 34 may squeeze the sides of the supporting structure. To release the retainer 12 from either structure, the angled tabs 36 are simply forced apart and moved away from the structure.

As shown in FIGS. 3 and 4, the elongated coil 14, preferably, has an arcuate shape that is a substantially circular. In particular, the elongated coil 14 has the general shape of a donut with a lower section of the donut removed. The length of the elongated coil 14 along its outer periphery 44, based on an outer radius 46, must be large enough to permit the two ends 48 of the elongated coil to meet at the base 30 of the retainer 12. The elongated coil 14 also has an inner periphery 50 that is smaller than the outer periphery 44, and an inner radius 52 that is less than the outer radius 46. Preferably, the ratio of the outer radius 46 relative to the inner radius 52 is about 2 to 1. For example, for the preferred embodiment, the outer radius 46 is about 5/8 of an inch and the inner radius 52 is about 5/16 of an inch.

As shown in FIGS. 1 and 2, the elongated coil 14 is positioned away from the supporting structure, specifically the end portion 20 of the guitar neck 22 and the vertical pole 24 of the microphone stand 26. In addition, the part of the supporting structure that is closest to the elongated coil 14 is covered, and thus protected, by the retainer 14. Thus, the retainer 12 acts as a protective layer between the elongated coil 14 and the surface of the supporting structure in the event that the elongate coil bends down toward the surface. Accordingly, the likelihood of damage to the supporting structure by the elongated coil 14 is significantly reduced.

The elongated coil 14 is made of a material that is rigid enough to retain its arcuate form and substantially resist the force of an incoming object, such as guitar pick 18, that is inserted into the elongated coil. On the other hand, the elongated coil 14 must be flexible to permit quick and easy access to the object. Thus, it is preferred the elongated coil 14 be comprised of a semi-rigid material, such as flexible metal or aluminum.

Referring again to FIGS. 3 and 4, the elongated coil 14, when arcuately positioned on the base portion 30, provides a slot 54 between each pair of windings or turns 56 of the coil. Accordingly, a plurality of slots 54 are provided for receiving the object, such as a guitar pick. Since, as described above, the outer periphery 44 of the coil 14 is greater than the inner periphery 50 and, yet, the number of windings 56 of the coil remains constant, each slot 54 has a generally V-shaped form. For each V-shaped slot 54, the wider part or outer region of the slot is at the outer periphery 44 of the elongated coil 14 and the narrower part or inner region of the slot is at the inner periphery 50. Thus, each slot 54 is wider at the outer periphery 44 to easily catch the object and narrower at the inner periphery 50 to hold the object within the slot.

Also, each individual winding or turn 56 of the elongated coil 14 is positioned between a pair of slots 54 and acts to deflect an object or guitar pick into one of those slots adjacent to that winding or turn 56. In other words, an object or guitar pick that hits a winding or turn 56 instead of a slot 54 will automatically deflect into an adjacent slot. Accordingly, an object or guitar pick may approach the elongated coil 14 without being directed toward a particular slot 54 since the elongated coil will guide the object into the nearest slot.

Referring to FIGS. 3 and 4, both ends 48 of the elongated coil 14 are secured to the base portion 30 of the retainer 12. Specifically, both ends 48 are secured directly above the retainer 12 by conventional means, such as, for example, a screw or, preferably, the rivet 16. The means for securing the elongated coil 14 above the base portion 30 of the retainer 12, such as the rivet 16, may be removed or unscrewed to provide for easy replacement of the elongated coil. Alternatively, the elongated coil 14 and retainer 12 may be integrally formed.

The invention having been thus described with particular reference to the preferred forms thereof, it will be obvious that various changes and modifications may be made therein without departing from the spirit and scope of the invention as defined in the appended claims.

What is claimed is:

1. A holder for removable attachment to a supporting structure that provides convenient access to an object held by the holder, the holder comprising:

a retainer having a base portion and a pair of arms, each arm extending from the base portion for clamping about the supporting structure;

a ridge formed on each arm of said retainer, said ridges of the pair of arms being effective for applying opposing forces against the supporting structure; and an elongated coil of resilient wire being secured to the base portion of said retainer and having an arcuate shape, said elongated coil having a plurality of individual turns that form a plurality of slots for receiving the object.

2. The holder of claim 1, wherein each arm of said retainer has a distal end, and each ridge of the pair of arms is offset from its respective distal end.

3. The holder of claim 1, wherein the pair of arms of said retainer have inner surfaces and at least one cushion layer that lines the inner surfaces for preventing damage to the supporting structure.

4. The holder of claim 1, wherein the pair of arms of said retainer are substantially identical.

5. The holder of claim 1, wherein said ridges of the pair of arms are substantially linear and identical.

6. The holder of claim 1, wherein each arm of said retainer includes a curved body portion extending from the base portion of said retainer for clamping about a post member.

7. The holder of claim 6, wherein each arm of said retainer includes an angled tab disposed at one end of the arm, and wherein said ridge is disposed between said curved body portion and said angled tab.

8. The holder of claim 1, wherein each individual turn of said elongated coil is capable of deflecting the object into one of said plurality of slots.

9. The holder of claim 1, wherein each of said plurality of slots has an outer region for receiving the object and an inner region for holding the object.

10. The holder of claim 1, wherein said elongated coil has an outer periphery and an inner periphery, and wherein the outer periphery is greater in length than the inner periphery.

11. The holder of claim 1, wherein said elongated coil has two ends that are secured at a desired point above the base portion of said retainer.

12. The holder of claim 1, wherein said plurality of slots of said elongated coil being capable of receiving a guitar pick.

13. A holder for removable attachment to a supporting structure that provides convenient access to an object held by the holder, the holder comprising:

a retainer having a base portion and a pair of arms, each arm extending from the base portion for clamping about the supporting structure; and an elongated coil of resilient wire being secured to the base portion of said retainer and having an arcuate shape, said elongated coil having a plurality of individual turns that forms a plurality of slots for receiving the object, each individual turn of said elongated coil having an outer curvature for receiving the object from any circular angle.

14. The holder of claim 13, wherein the pair of arms of said retainer have inner surfaces and at least one cushion layer that lines the inner surfaces for preventing damage to the supporting structure.

15. The holder of claim 13, wherein each individual turn of said elongated coil has a substantially circular cross-section.

16. The holder of claim 13, wherein each individual turn of said elongated coil is capable of deflecting the object into one of said plurality of slots.

17. The holder of claim 13, wherein each of said plurality of slots has an outer region for receiving the object and an inner region for holding the object.

18. The holder of claim 13, wherein said elongated coil has an outer periphery and an inner periphery, and wherein the outer periphery is greater in length than the inner periphery.

19. The holder of claim 13, wherein said elongated coil has two ends that are secured at a desired point above the base portion of said retainer.

20. The holder of claim 13, wherein said plurality of slots of said elongated coil being capable of receiving a guitar pick.

* * * * *